(12) United States Patent
Serra Obiol et al.

(10) Patent No.: US 10,183,460 B2
(45) Date of Patent: Jan. 22, 2019

(54) SYSTEM FOR HANDLING DIES COMPRISING A SUPPORT AND A HANDLER

(71) Applicant: Comercial Industrial Maquinaria Carton Ondulado, S.L., Barcelona (ES)

(72) Inventors: Ramon Serra Obiol, Barcelona (ES); Jordi Puig Vargas, Barcelona (ES)

(73) Assignee: Comercial Industrial Maquinaria Carton Ondulado, S.L., Barcelona (ES)

( * ) Notice: Subject to any disclaimer, the term of this patent is extended or adjusted under 35 U.S.C. 154(b) by 228 days.

(21) Appl. No.: 15/316,183

(22) PCT Filed: Jun. 3, 2015

(86) PCT No.: PCT/ES2015/070440
§ 371 (c)(1),
(2) Date: Dec. 5, 2016

(87) PCT Pub. No.: WO2015/185783
PCT Pub. Date: Dec. 10, 2015

(65) Prior Publication Data
US 2017/0197377 A1    Jul. 13, 2017

(30) Foreign Application Priority Data
Jun. 3, 2014   (ES) .................................. 201430847

(51) Int. Cl.
*B23Q 3/155* (2006.01)
*B31F 1/07* (2006.01)
(Continued)

(52) U.S. Cl.
CPC .............. *B31F 1/07* (2013.01); *B23Q 3/1556* (2013.01); *B23Q 3/15566* (2013.01); *B26F 1/14* (2013.01);
(Continued)

(58) Field of Classification Search
CPC .......... B41P 2219/30; B26F 1/14; B26F 1/38; B26F 2210/02; B23Q 3/155;
(Continued)

(56) References Cited

U.S. PATENT DOCUMENTS 5,051,051 A * 9/1991 Grabill ................ B21D 37/145
280/43.23
5,147,176 A * 9/1992 Stolzer ................ B65G 1/0442
198/346.1
(Continued)

FOREIGN PATENT DOCUMENTS

WO    WO 2014029202 A1 * 2/2014 ........... B65G 1/0457

*Primary Examiner* — Daniel Howell
*Assistant Examiner* — Yasir Diab (57) ABSTRACT

System for handling dies with a rectangular and/or arched transverse cross-section that comprises a support for placing in a removable manner dies having a rectangular transverse cross-section, the support being designed to be coupled in a sliding manner to a fixed structure, in which at least said support has fastening means for holding at least one die with a rectangular transverse cross-section vertically in the air; and a handler provided with hooking means designed to be coupled to the support to place and/or remove the support with respect to the fixed structure, the handler having coupling means to be coupled to a transelevator or similar. This system is designed to facilitate the operations of placing and removing the dies during their storage.

8 Claims, 6 Drawing Sheets

(51) Int. Cl.
*B26F 1/14* (2006.01)
*B26F 1/38* (2006.01)

(52) U.S. Cl.
CPC .............. *B26F 1/38* (2013.01); *B26F 2210/02* (2013.01); *B31F 2201/0776* (2013.01); *B41P 2219/30* (2013.01); *Y10T 483/1731* (2015.01)

(58) Field of Classification Search
CPC .............. B23Q 3/1556; B23Q 3/15566; Y10T 483/1729; Y10T 483/1731; B31F 2201/0776
USPC ....................................... 101/26; 83/549–552
See application file for complete search history.

(56) References Cited

U.S. PATENT DOCUMENTS

| | | | | |
|---|---|---|---|---|
| 5,379,229 A * | 1/1995 | Parsons | ................ | B65G 1/1378 |
| | | | | 414/273 |
| 5,791,852 A * | 8/1998 | Bibby | .................. | B21D 37/145 |
| | | | | 414/274 |
| 6,280,135 B1 * | 8/2001 | Cunningham | ....... | B23D 35/008 |
| | | | | 414/277 |

* cited by examiner

SYSTEM FOR HANDLING DIES COMPRISING A SUPPORT AND A HANDLER

RELATED APPLICATIONS

This application is a National Phase of PCT Patent Application No. PCT/ES2015/070440 having International filing date of Jun. 3, 2015, which claims the benefit of priority of Spanish Patent Application No. P201430847 filed on Jun. 3, 2014. The contents of the above applications are all incorporated by reference as if fully set forth herein in their entirety.

OBJECT OF THE INVENTION

The aim of the present invention patent application is to register a system for handling dies, which incorporates significant innovations and advantages.

More specifically, the invention proposes the development of a die-handling system, both for dies having a rectangular and/or arched transverse cross-section (also known as rotating dies), intended to facilitate the operations of placing and removing the dies during storage thereof.

FIELD AND BACKGROUND OF THE INVENTION

Flat-shaped dies, for example, those used to shape cardboard boxes, usually are stored on shelves provided with compartments in which the different parts comprising the die are placed. The undersides of said parts of the die rest on the surface of the shelf compartment and remain in a vertical position when resting laterally against the lateral walls of the compartment, which means that there is a risk that the edges of the die, which are in contact with the floor or lateral walls, be damaged or deformed, or incorrectly placed, with the risk that they might fall unintentionally.

Due to the weight and the irregular shapes of these flat dies, their storage is usually carried out at floor level in order to facilitate the handling thereof while removing and placing the dies from/on the shelves.

The arrangement of drawers to store dies when they are not in use is also known. However, this arrangement has the drawback that blades or other elements protruding from the die itself may be damaged or bent while the dies are placed in or removed from the drawers.

SUMMARY OF THE INVENTION

The present invention has been developed in order to provide a system for handling dies designed to be a novelty within the application field and to solve the aforementioned drawbacks, bringing, in addition, other additional advantages, which will become apparent from the description enclosed below.

Therefore, an object of the present invention is to provide a system for handling dies, either with a rectangular and/or arched transverse cross-section, comprising:

at least one support for placing dies in a removable manner, the support being designed to be coupled in a sliding manner to a fixed structure, in which at least said support has fastening means for holding a plurality of dies vertically in the air; and a handler provided with hooking means designed to be coupled to the support to place and/or remove the support with respect to the fixed structure, the handler having coupling means to be coupled to moving means.

Thanks to these characteristics, a quick and safe system has been developed, which enables to store and handle properly the dies, for dies having either an arched transverse cross-section or a rectangular or substantially rectangular transverse cross-section, for example, on shelves such that the dies with rectangular cross-section are suspended and arranged vertically, so they are not in direct contact with any support surface or side of the shelf or storage area. This way, the risk of damaging the dies as a result of blows is reduced.

Another advantage of the system described above with regard to the state of the art is the ease with which the dies are stored when compared to other known systems of the art, such as the arrangement of drawers described above.

Preferably, the aforementioned transport means consist of a transelevator or similar, which is especially suitable when there are different height levels in the dies' storage area.

According to another feature of the invention, the support for placing the dies has rolling means that can slide over guiding profiles located on the fixed structure.

Another object of the invention is to protect a support for placing dies, particularly designed to be transported by means of a handler, characterized in that it essentially comprises a substantially U-shaped elongated profile in which fastening means are arranged along said profile, in order to hold at least one die vertically in the air, such fastening means being provided with rolling means that facilitate the movement of the support over a handler or in the storage area, for example a shelf.

According to another aspect of the aforementioned support, the fastening means may consist of at least one pair of hooking elements, the hooking element being formed by a body having a U-shaped upper length associated to the rolling means and a linear elongated lower length that has a bent tip.

In addition, the ends of the substantially U-shaped profile include secondary rolling means that may be equal or similar to the aforementioned rolling means.

Advantageously, one end of the substantially U-shaped profile is coupled to a laminar part provided with a flat portion and a second portion that has one through-hole.

Preferably, the laminar part is fixed by mounting hardware to the substantially U-shaped profile.

Another additional object of the invention is to provide a handler to place and/or remove a support for placing dies, which comprises a frame that has hooking means, which move axially and linearly so as to be coupled to a support for placing dies and a rest area in which the dies are available. This handler is especially suitable for being fixed in a conventional transelevator in order to facilitate and reduce the die-handling time inside an industrial enclosure.

Preferably, the hooking means comprise a hook mounted on a moving trolley that is supported on a main trolley, the moving trolley being driven by motor means.

According to another aspect, the rest area of the handler has guiding means through which the support for the dies slides.

In a particularly preferred embodiment, the guiding means comprise a pair of profiles that are spaced sufficiently apart from one another so as to allow a support for the dies to pass through.

Furthermore, additionally, the rest area has a pair of elongated secondary guide profiles, which are substantially U-shaped, spaced from one another, and designed for placing dies having an arched transverse cross-section.

Other features and advantages of the system for handling dies, object of the present invention, will become apparent from the description of a preferred embodiment, but not exclusive, which is illustrated by way of non-limiting example in the accompanying drawings, in which:

DESCRIPTION OF SPECIFIC EMBODIMENTS OF THE INVENTION

In view of the aforementioned figures and according to the numerals adopted, a preferred exemplary embodiment of the invention may be observed therein, which comprises the parts and elements indicated and described in further detail below.

Figures 1, 1A, 1B:
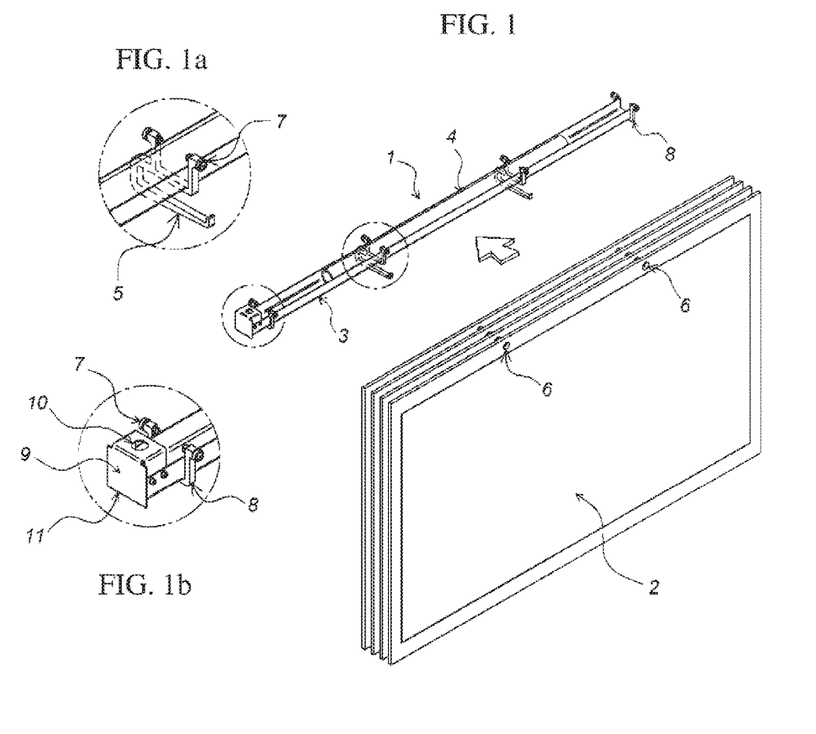
FIG. 1.—Is a perspective view of a die support according to the present invention and a plurality of dies with rectangular transverse cross-section designed to be mounted onto the support.
FIG. 1a.—Is a detailed perspective view of a hooking element that forms part of the die support.
FIG. 1b.—Is a detailed perspective view of the laminar part located at the end of the elongated profile of the support.
Figures 2, 2A:
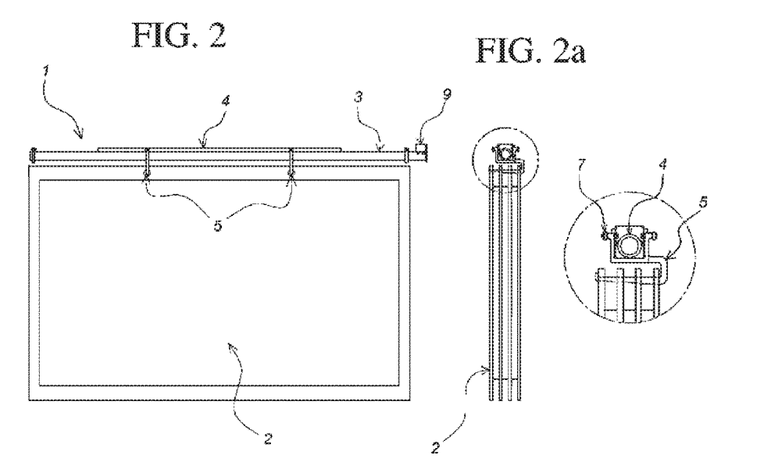
FIG. 2.—Is a side elevation view of support with dies placed thereon.
FIG. 2a.—Is a front elevation view of the support exhibited in FIG. 2.

Thus, as can be appreciated in FIGS. 1 to 2 there is a support, generally indicated with the reference (1), which is designed to store dies with a rectangular transverse cross-section (2) and that forms part of a system for handling dies. Said support (1) has an elongated profile with a substantially U-shaped cross-section (3), inside which it is possible to deposit a small tube (4) suitable for holding acetate sheets, which are used to regulate the die in a die-cutting machine of the known type (not represented) for example, a machine for die-cutting and shaping cardboard boxes.

In the middle portion of the profile (3) two hooking elements are fixed, which are shaped as a hanger (5) and are spaced from one another, the same distance that various holes (6) realized in the flat die (or with a rectangular transverse cross-section) (2), which will be used to hang it in the support (1). Said hooking elements (5) are provided with rolling means indicated with the reference (7). Other elements (8) provided with secondary rolling means are fixed at the two opposed ends of the profile (3). In addition, at the end of the elongated profile (3) a laminar part (9) that has a through hole (10) and a flat bent portion (11) can be appreciated, over which a die identification can be placed by way of label or engraving.

Figures 3, 3A:
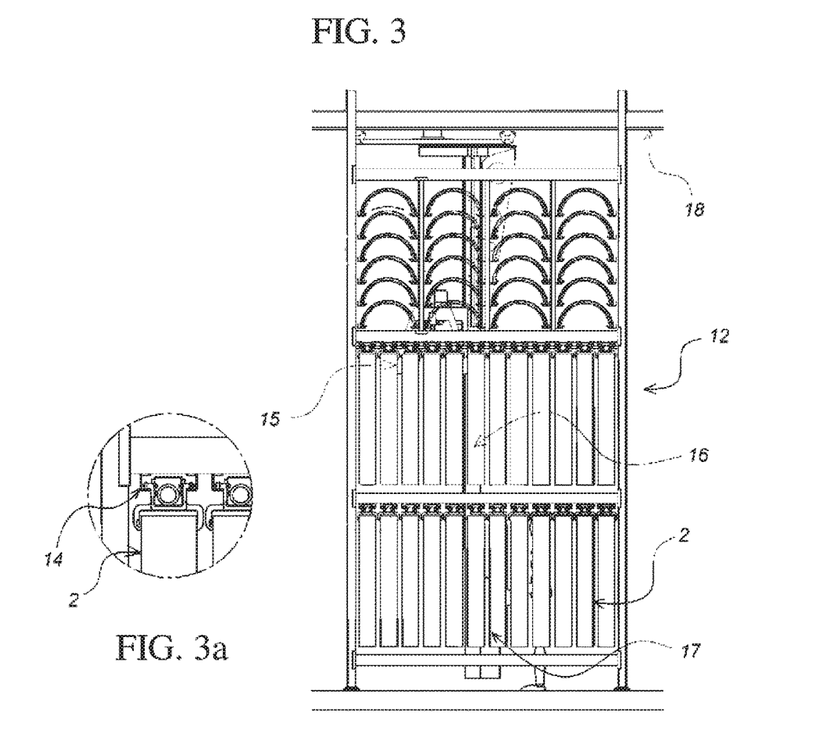
FIG. 3.—Is a front elevation view of a shelf module designed to place the supports for dies having a rectangular and/or arched transverse cross-section.
FIG. 3a.—Is an enlarged detailed view of a front elevation of a region of FIG. 3.

In FIG. 3, a shelf module is shown, generally indicated with the reference (12), on which flat dies (2) are stored on two lower levels and arched dies (13) on the uppermost level. The flat die (2) hangs from the support (1) and in turn, the latter hangs from guiding profiles with a U-shaped cross-section (14) fixed on the rungs of the shelf, as it can be seen more clearly in FIG. 3a. Said guiding profiles (14) enable the rolling means (7) located in the profile (3) of the support to slide, which makes easier to place and/or remove them.

Advantageously, the handler (15) may be mounted on a transelevator over which it may move vertically either automatically or controlled by the user from a control desk. The transelevator may move longitudinally by means of the guides placed on the upper portion of an installation in a known manner, so the description does not enter into greater detail in this regard.

Figures 4, 4A, 4B:
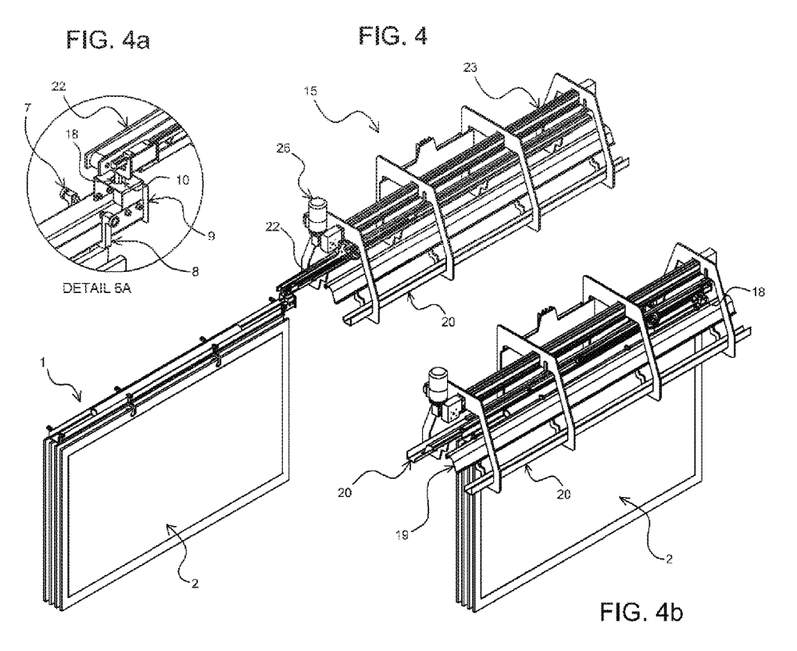
FIG. 4.—Is a perspective view of the handler of the invention in a handling condition of a support for dies, holding a plurality of dies, which have a rectangular transverse cross-section.
FIG. 4a.—Is a detailed perspective view of the coupling or hooking area between the die support and the handler.
FIG. 4b.—Is a perspective view of the die support of FIG. 1 housed in the handler exhibited in FIG. 4.
Figures 5, 5A:
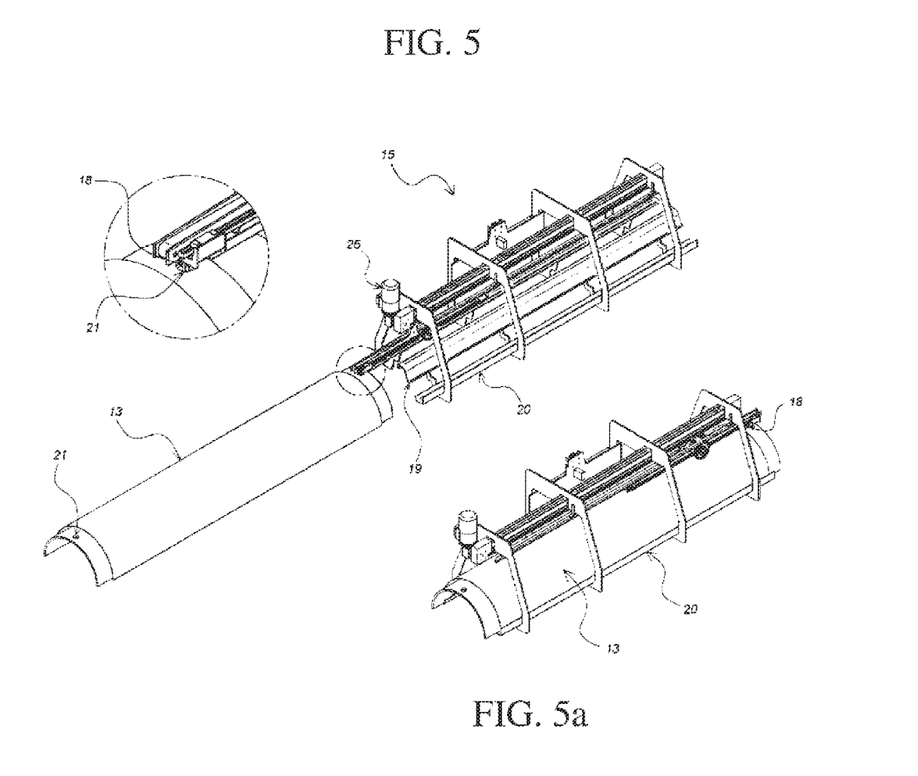
FIG. 5.—Is a perspective view of the handler of the invention in a handling condition of a die with an arched transverse cross-section.
FIG. 5a.—Is a perspective view of the handler exhibited in FIG. 5 in a holding condition of the arched die.

FIGS. 4 and 5 show the operation of removing a die with a rectangular transverse cross-section (2) and a die with an arched transverse cross-section (13), respectively. In both cases, it can be seen how by means of the same hook (18), which in this case is motorized, it is possible to drive both types of die in order to place them over the handler (15). In the case of the dies with a rectangular transverse cross-section (2), the hook (18) is inserted into the through hole (10) of the laminar part (9) fixed to the elongated profile (3) of the support (1) whereas in the case of the dies with an arched transverse cross-section (13), the hook (18) is inserted into the hole (21) realized on the end of the die itself that has an arched transverse cross-section (13). In addition, in FIG. 4 it can be observed how when the handler (15) operates to grip the support (1), the profile (3) of the support (1) and the guiding profile (19) are aligned thus forming the same track over which the rolling means (7) can slide.

Also in FIGS. 4 and 5 the handler (15) is shown together with a die that has a rectangular transverse cross-section (2) and a die that has an arched transverse cross-section (13), respectively. It can be appreciated the guiding profile (19) over which the support (1) of the die that has a rectangular transverse cross-section (2) slides and the secondary guiding profile (20) over which the die that has an arched transverse cross-section (13) moves.

Now, with particular reference to FIGS. 4, 4a and 4b, so that the hook (18) can reach both the through hole (10) of the support (1) of the flat dies (2) and the hole (21) located in the dies with an arched cross-section or also known as rotating dies (13) on both sides of the handler (15) (in the case in which the latter is between two shelves (12) said hook (18) is mounted on a moving trolley (22), which in turn hangs from a main trolley (23)). This enables, by means of a transmission formed by a rack that is integral to the frame of the main trolley (23) and a cogwheel integral to the moving trolley (22), the hook (18) to move from one end to the other of the frame of the moving trolley (22), while the main trolley (23) moves from one end to the other its own frame by means of a motor drive (26).

Figure 6:
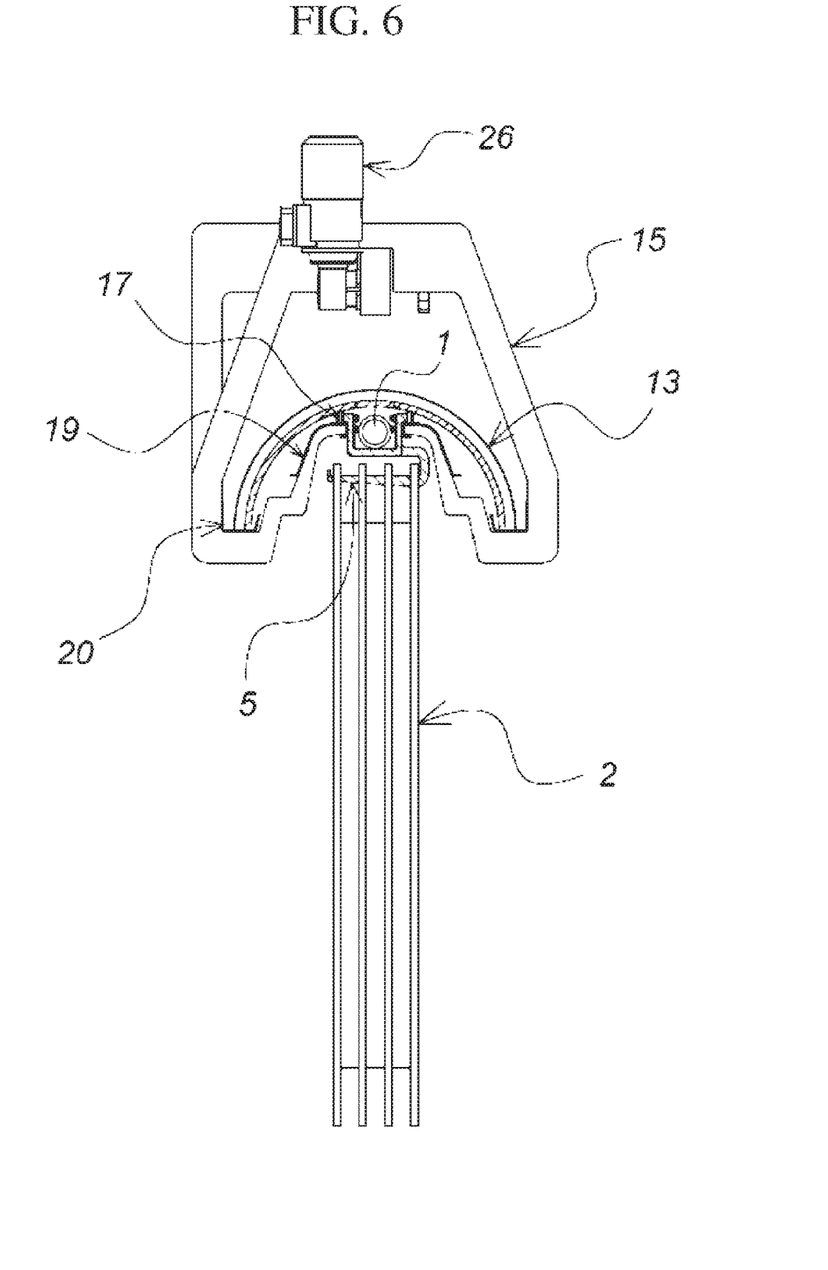
FIG. 6.—Is a side elevation view of the die-handling system, i.e., the die support mounted on the handler.

In FIG. 6 a side elevation view of the handler (15) together with a support (1) placed in the rest area is shown, such that it is possible to see the arrangement adopted by the dies having a rectangular cross section rectangular or flat die (2) in a vertical and suspended condition and, secondly, the die with an arched cross-section (13) located above the dies (2). In said FIG. 6 it is possible to see thus the shape and the position of the guiding profiles (19), as well as, the secondary guiding profiles (20) in the handler (15) so that it is possible to make compatible the handling of both die types (2) and (13).

The details, shapes, dimensions and remaining accessory elements, employed in the manufacturing of the system for handling dies of the invention may be conveniently replaced with others that do not depart from the scope as defined by the appended claims.

What is claimed is:

1. A system for handling dies with a rectangular and/or arched transverse cross-section, comprising:
    at least one support (1) for placing in a removable manner dies having a rectangular transverse cross-section, the support being designed to be coupled in a sliding manner to a fixed structure, in which at least said support (1) has fastening means for holding at least one die with a rectangular transverse cross-section vertically in the air; and
    a handler provided with hooking means designed to be coupled to the support (1) to place and/or remove the support with respect to the fixed structure, the handler having coupling means to be coupled to a moving mean,
    characterized in that support comprises a substantially U-shaped elongated profile (3) in which fastening means are secured along said profile, in order to hold at least one die vertically in the air, said fastening means being provided with rolling means (7), characterized in that includes a rest area having a pair of elongated secondary guide profiles, which are substantially U-shaped, spaced from one another, and designed for placing dies having an arched transverse cross-section so that dies with an arched cross-section (13) are located above the rectangular cross-section dies (2).

2. The system for handling dies according to claim 1, characterized in that the transport means consist of a transelevator or a similar transport mean.

3. The system for handling dies according to claim 1, characterized in that the support (1) for placing the dies has rolling means that can slide over guiding profiles located in the fixed structure.

4. A handler (15) to place and/or remove a support (1) for placing dies with a rectangular and/or arched transverse cross-section, comprising a frame that has hooking means, which move axially and linearly so as to be coupled to a support for placing dies and a rest area in which the dies are available, in that support comprises a substantially U-shaped elongated profile (3) in which fastening means are secured along said profile, in order to hold at least one die vertically in the air, said fastening means being provided with rolling means (7), characterized in that the rest area has a pair of elongated secondary guide profiles, which are substantially U-shaped, spaced from one another, and designed for placing dies having an arched transverse cross-section so that dies with an arched cross-section (13) are located above the rectangular cross-section dies (2).

5. The handler (15) according to claim 4, characterized in that the hooking means comprise a hook mounted on a moving trolley (22) that is supported on a main trolley (23), the moving trolley being driven by motor means (26).

6. The handler (15) according to claim 4, characterized in that the rest area has guiding means through which a support (1) slides.

7. The handler (15) according to claim 6, characterized in that the guiding means comprise a pair of profiles spaced sufficiently apart from one another so as to allow a support (1) to pass through.

8. The system for handling dies according to claim 1, characterized in that it comprises a substantially U-shaped elongated profile (3) in which fastening means are secured along said profile, in order to hold at least one die vertically in the air, said fastening means being provided with rolling means (7).

* * * * *